April 12, 1955     J. R. ORELIND ET AL     2,705,970
POWER WASHING CREAM SEPARATOR WITH RACK TYPE METERING VALVE
Filed July 24, 1953     2 Sheets-Sheet 1

INVENTORS
JOHN R. ORELIND
WILLIAM H. HARSTICK

ATTORNEY

April 12, 1955    J. R. ORELIND ET AL    2,705,970
POWER WASHING CREAM SEPARATOR WITH RACK TYPE METERING VALVE
Filed July 24, 1953    2 Sheets-Sheet 2
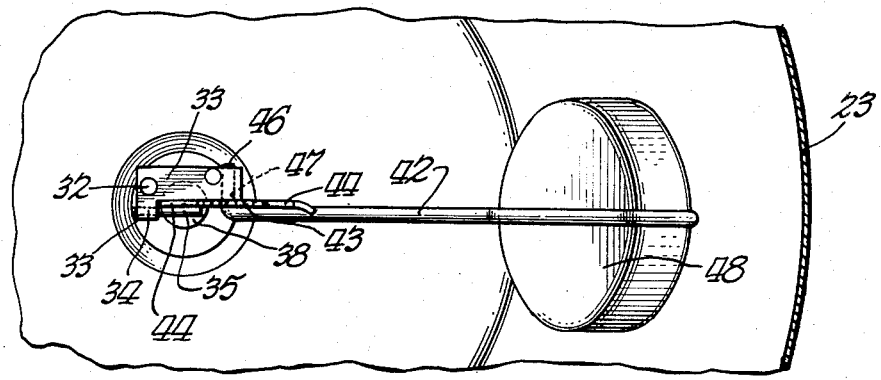
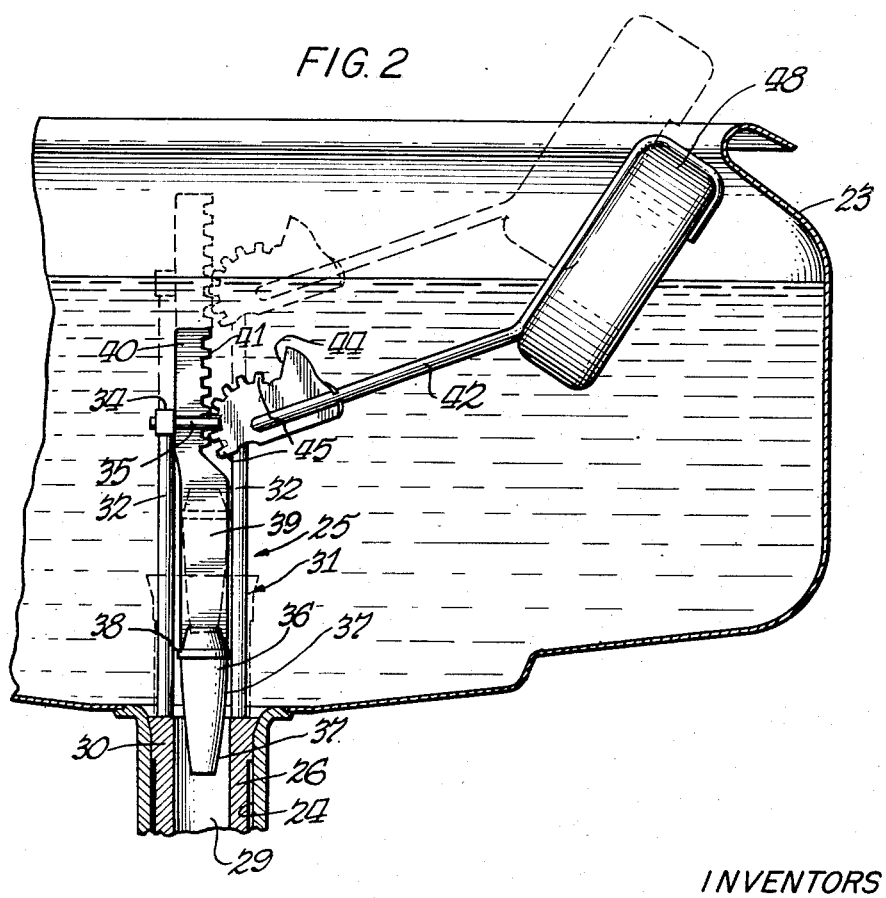
INVENTORS
JOHN R. ORELIND
WILLIAM H. HARSTICK
ATTORNEY United States Patent Office 2,705,970
Patented Apr. 12, 1955

2,705,970

POWER WASHING CREAM SEPARATOR WITH RACK TYPE METERING VALVE

John R. Orelind, Wilmette, and William H. Harstick, Oak Park, Ill., assignors to International Harvester Company, a corporation of New Jersey Application July 24, 1953, Serial No. 370,119

10 Claims. (Cl. 137—238)

This invention relates to an improvement in a power washing cream separator. More particularly, the invention relates to a metering valve for controlling the discharge of liquid from a supply can to the separating bowl of a power washing cream separator.

In W. H. Harstick's Patent 2,504,261, patented April 18, 1950, a power washing cream separator is disclosed. In general, a separator of this type includes a separating bowl which is provided with a peripheral discharge valve for controlling the discharge of a washing liquid from the bowl. The separator comprises a supply can which includes a discharge tube. The discharge tube is also provided with a milk-feed tube which has an annular shoulder for normally closing the discharge tube during the separating operation. In order to secure a controlled steady flow of liquid to the separating bowl, a metering valve is provided. The metering valve is effective, during the lowering of the liquid level within the supply can, to progressively open the milk-feed tube thereby permitting a constant amount of liquid to flow into the separating bowl despite the lowering of the liquid head in the supply can. The metering valve, as shown in the patent, is also effective to displace the milk-feed tube from the discharge tube to permit controlled quantities of washing liquid to enter through the discharge tube and through the milk-feed tube for effectively cleansing the separating bowl.

It is a prime object of this invention to provide an improved metering valve for directing and controlling the flow of liquids from a supply can into the separating bowl of a power washing cream separator.

It is a still further object to provide an improved metering valve for power washing cream separators, the valve including a vertically movable metering member having a tapered metering surface adapted to be moved relative to the opening of a milk-feed tube for controlling the flow of liquids through said tube.

A still further object is to provide an improved metering valve for power washing cream separators, the valve including a metering member having a rack arm connected thereto, the rack arm being vertically movable with respect to a milk-feed tube for controlling the movement of the metering member relative to the opening of the milk-feed tube, the valve further including a pinion engageable with the rack, the said pinion being movable by means of a float in response to the lowering of the liquid level within the supply can of the separator.

Further and more specific objects will become readily apparent from a reading of the specification when examined in connection with the accompanying sheets of drawings.

In the drawings:

Figure 2 is a sectional view through portions of a cream separator showing a supply can and a metering valve arrangement; and Figure 3 is a fragmentary plan view of the supply can shown in Figure 2, also disclosing a metering valve assembly.

Figure 1:
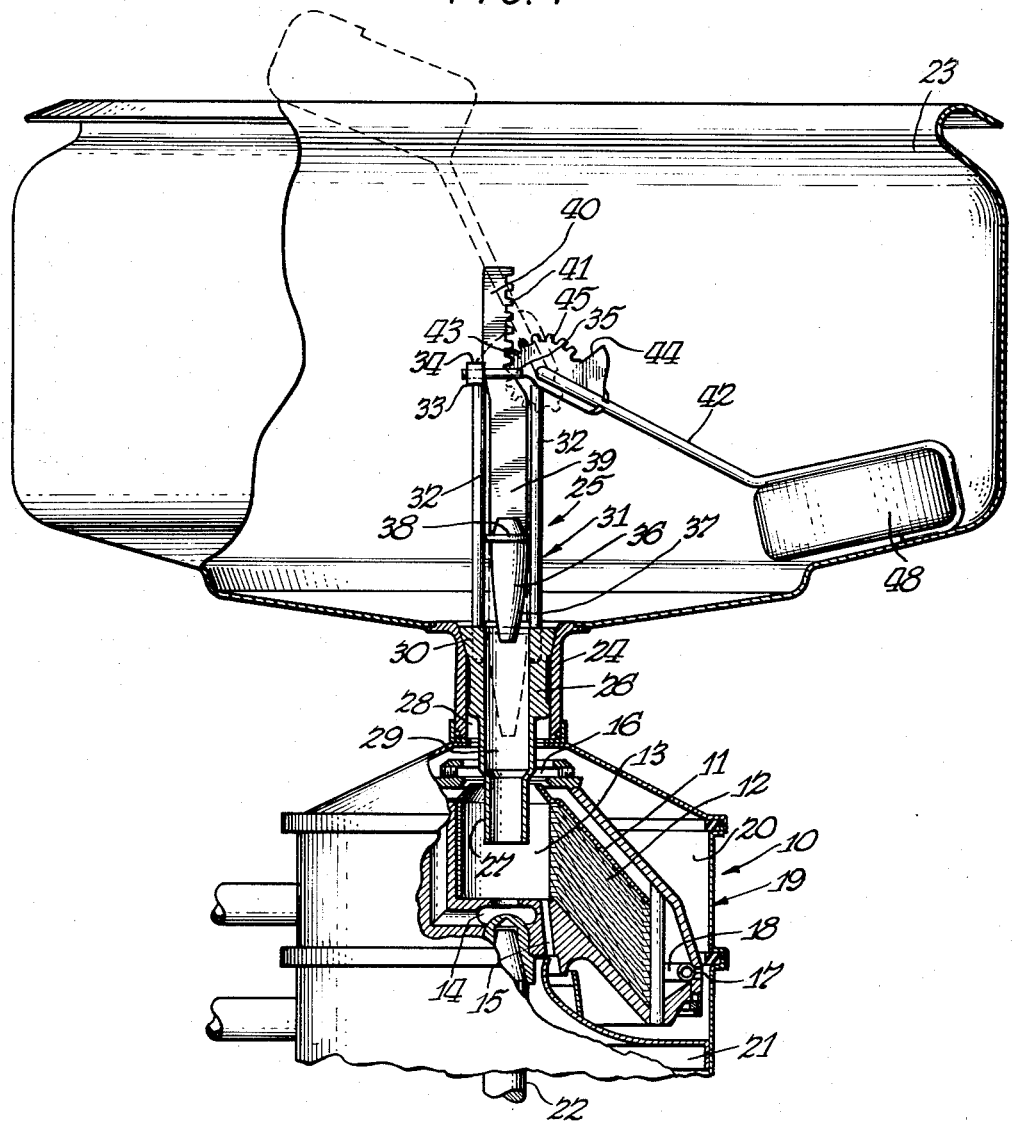
Figure 1 is a side elevational view of a power washing cream separator and metering valve arrangement, the view having certain portions broken away to show, in section, pertinent parts of the invention.

Referring particularly to Figure 1, a power washing cream separator is generally designated by the reference character 10. The cream separator 10 comprises a separating bowl 11 having a conventional disk pack 12. The disk pack 12 includes a centrally disposed receiving space 13 which is in communication with a distributor 14. A downwardly extending cream outlet 15 is in communication with the receiving space 13. The bowl 11 is also provided with a skim-milk outlet 16 for withdrawing skim milk from the receiving space 13.

A washing liquid discharge outlet 17 is provided at the outer peripheral edge of the separating bowl 11. A ring valve 18, of resilient construction, is positioned adjacent the discharge outlet 17, this construction being more specifically described in the above-mentioned patent. A tinware construction 19 surrounds the separating bowl 11. The tinware construction 19 includes a skim-milk receiving chamber 20 and a cream receiving chamber 21. A drive spindle 22 is suitably connected to a power unit (not shown) for driving the cream separating bowl in a conventional fashion.

A supply can 23 is positioned above the separating bowl 11 and a discharge outlet 24 is connected to the lower end of the can 23 for discharging liquids from said can.

Referring now particularly to Figures 1 to 3 inclusive, a metering valve assembly is designated at 25. The valve assembly 25 includes a milk-feed tube 26 which is supported on, and disposed within the discharge outlet tube 24. The milk-feed tube 26 includes a projecting tubular portion 27 having a lesser cross-sectional diameter than the discharge tube 24. Upon axial partial withdrawal of the feed tube 26, the projecting tube 27 forms with the discharge tube 24, a washing liquid discharge passage 28 and a milk-feed passage 29. The milk-feed tube 26 also includes an annular enlargement or sealing shoulder 30 which, as indicated in Figure 1, is adapted to engage the upper end of the discharge tube 24 in sealing engagement. A support, generally designated at 31, is connected to the feed tube 26 and extends upwardly within the supply can 23.

The support 31 includes a pair of laterally spaced upright supporting members 32 connected at their lower ends to the milk-feed tube 26. The upper ends of the supporting members 32 are connnected to a pivot block or pivot support 33, as best indicated in Figure 3. The pivot support 33 includes a projecting corner 34 from which a pin 35 extends in laterally spaced and parallel relation with respect to the support 33.

A metering member is designated at 36. The metering member includes an annular tapering metering surface 37. The metering surface 37 may also be described as having a progressively less cross-sectional dimension than the cross-sectional dimension of the milk-feed tube 26. The metering member 36 also includes at its upper end an annular sealing enlargement 38. A rack arm 39 is connected to the upper end of the metering member 36. The rack arm 39 is provided at its upper end with a rack 40 comprising a plurality of teeth 41.

A float arm 42 is disposed within the supply can 23, the arm 42 including a pinion member 43 which is movable with the float arm 42. The pinion 43 also includes a shoulder or flat portion comprising a stop 44. The pinion 43 includes teeth 45 adapted to mesh with the teeth 41 of the rack 40. The float arm 42 has at one end, as best shown in Figure 3, a laterally extending pivot part 46 which is suitably journalled within a pivot bore 47 of the pivot support 33. The float arm 42 is also provided with a float 48.

During the conventional cream separating operation, it is desired to supply a controlled and steady quantity of whole milk through the feed tube 26 and to the space 13 of the separating bowl 11. In the dotted line position, shown in Figure 1, the float arm 42 has been moved to a substantially upright position wherein the rack arm 39 is moved to its extreme lowermost position and the sealing enlargement 38 is in engagement with the feed tube 26 to close the milk-feed passage 29. The stop 44 of the pinion 43 has been pivoted into engagement with the projecting corner 34 and thus maintains the float arm 42 in the substantially upright, though slightly tilted position, indicated in dotted lines in Figure 1. During the separating operation, the arm 42 is pivoted so that the float 48 rests on the top of the liquid within the supply can 23. The clockwise movement of the float arm 42 causes the rack arm 39 and the metering member 36 to move axially or slightly upwardly with respect to the milk-feed tube 26 and whole milk can now descend through the feed tube 26 into the separating bowl 11. As the liquid level descends within the supply can 23, the head pressure is, of course, decreased and in order to get the same amount of liquid through the milk-feed tube, it is necessary to displace the metering surface 37 axially, thereby enlarging the opening afforded by the milk-feed tube 26. This is accomplished progressively by the further clockwise movement of the float arm 42 which causes further vertical movement of the rack arm 39 as the liquid level descends within the supply can 23.

As indicated in Figure 1, when the supply can 23 has been substantially drained, the float 48 is in the position indicated and the metering member 36 is displaced to its maximum open position.

In the full line position of the metering member 36, shown in Figure 2, the metering surface 37 has been partially displaced relative to the upper end of the feed tube 26 and in this position approximately one-third of the liquid within the supply can 23 has been discharged. In the dotted line position, shown in Figure 2, the operator has grasped the float arm 42 and has lifted the same vertically bodily, thereby also moving the milk-feed tube 26 axially with respect to the discharge tube 24. In this position the washing liquid discharge passage 28 is opened since the shoulder 30 has been removed from the top of the discharge tube 24. This arrangement is accomplished during the washing operation of the separating bowl and it is desired to have washing liquid descend both through the milk-feed tube 26 or passage 29 and also through the passage 28 of the discharge tube 24. Thus, in the dotted line position of Figure 2, the metering member 36 has been axially displaced a sufficient degree to permit a certain amount of washing liquid to descend through the milk-feed passage 29. Thus, the discharge passage 28 has also been opened and washing liquid can descend from the supply can 23.

The structure disclosed is simple in operation and also may be readily washed. In order to remove the metering assembly for washing, the whole assembly is raised vertically with respect to the supply can 23. The float arm 42 may now be pivoted in a clockwise direction to a greater degree than shown in Figure 1, so that the end or lowermost tooth 45 of the pinion 43 may be pivoted upwardly beyond the pin 35 so that the float arm 42 and pivot part 46 may be withdrawn from the pivot bore 47. The rack arm 39, including the metering member 36, may now be separated from the feed tube 26 and support 31 to permit washing of the parts. In the reassembled position the pin 35 engages one side of the pinion 43 to prevent lateral displacement of the pivot part 46 with respect to the bore 47.

It can now be seen that an effective and novel metering valve assembly has been disclosed and described. It must be understood that changes and modifications may be made without departing from the spirit of the invention as disclosed or the scope thereof as defined in the appended claims.

What is claimed is:

1. In a power washing cream separator including a supply can, and a discharge tube connected to said can for discharging milk and washing liquid from said can; a metering valve comprising a milk-feed tube disposed within said discharge tube, said feed tube having its outer peripheral surface laterally spaced from the inner surface of said discharge tube to provide a washing liquid discharge passage and a milk-feed passage within said discharge tube, a shoulder on said milk-feed tube for engaging and closing said washing liquid passage, a support including a pair of upwardly extending laterally spaced supporting members connected to said milk-feed tube, a metering member vertically movable between said supporting members, said metering member having an outer peripheral metering surface tapering to a lesser cross-sectional diameter than said feed tube, an annular projection on said metering member, a rack arm connected to said metering member, a float arm pivotally connected to said support, a float on said float arm, and a pinion on said float arm engaging said rack arm, said metering member being movable from a mating position with said milk-feed passage wherein said projection engages said feed tube in sealing relation, by said float arm progressively upwardly during a lowering of the liquid level in said can whereby said metering surface is moved relative to said feed passage and the discharge of liquid is controlled therethrough.

2. In a power washing cream separator including a supply can, and a discharge tube connected to said can for discharging milk and washing liquid from said can; a metering valve comprising a milk-feed tube disposed within said discharge tube to provide a washing liquid discharge passage and a milk-feed passage, means on said milk-feed tube for engaging and closing said washing liquid passage, a support including a pair of upwardly extending laterally spaced supporting members connected to said milk-feed tube, a metering member vertically movable between said supporting members, said member having an outer peripheral metering surface tapering to a lesser cross-sectional diameter than said feed tube, a rack arm connected to said metering member, a float arm pivotally connected to said support, a float on said float arm, and a pinion on said float arm engaging said rack arm, said metering member being movable from a mating position with said milk-feed passage by said float arm progressively upwardly during a lowering of the liquid level in said can whereby said metering surface is moved relative to said feed passage and the discharge of liquid is controlled therethrough.

3. In a power washing cream separator including a supply can, and a discharge tube connected to said can for discharging milk and washing liquid from said can; a metering valve comprising a milk-feed tube disposed within said discharge tube to provide a discharge passage and a milk-feed passage, a support connected to said milk-feed tube, a metering member vertically movable with respect to said support, said member having an outer peripheral metering surface tapering to a lesser cross-sectional diameter than said feed tube, a rack arm connected to said metering member, a float arm pivotally connected to said support, a float on said float arm, and a pinion on said float arm engaging said rack arm, said metering member being movable from a mating position with said milk-feed passage by said float arm progressively upwardly during a lowering of the liquid level in said can whereby said metering surface is moved relative to said feed passage and the discharge of liquid is controlled therethrough.

4. In a power washing cream separator including a supply can, and a discharge tube connected to said can for discharging milk and washing liquid from said can; a metering valve comprising a milk-feed tube disposed within said discharge tube to provide a discharge passage and a milk-feed passage, a support connected to said milk-feed tube, a metering member vertically movable relative to said support, said member having an outer peripheral metering surface, a rack arm connected to said metering member, a float arm pivotally connected to said support, a float on said float arm, and a pinion on said float arm engaging said rack arm, said metering member being movable from a mating position with said milk-feed passage by said float arm progressively upwardly during a lowering of the liquid level in said can whereby said metering surface is moved relative to said feed passage and the discharge of liquid is controlled therethrough.

5. In a power washing cream separator including a supply can, and a discharge tube connected to said can for discharging milk and washing liquid from said can; a metering valve comprising a milk-feed tube associated with said discharge tube, a support connected to said milk-feed tube, a metering member vertically movable relative to said support, said member having an outer peripheral metering surface, a rack arm connected to said metering members, a float arm pivotally connected to said support, a float on said float arm, and a pinion on said float arm engaging said rack arm, said metering member being movable relative to said feed tube by said float arm progressively upwardly during a lowering of the liquid level in said can whereby said metering surface is moved relative to said feed tube and the discharge of liquid is controlled therethrough.

6. In a cream separator including a supply can and a discharge tube for discharging liquid from said supply can; a metering valve assembly comprising a milk-feed tube disposed within said discharge tube and providing therewith first and second concentric passages, a support connected to said feed tube, said support extending upwardly within said supply can, a rack arm positioned adjacent said support for relative vertical movement, a metering member connected to said rack arm for movement therewith, said metering member including an annular tapering metering surface adapted to move axially within said first passage, a float arm pivotally connected to said support, a pinion movable by said float arm, a float on said float arm, said pinion engaging said rack arm for moving the same during a lowering of the liquid level within said can whereby said metering surface is moved relative to said first passage and the flow of liquid is controlled therethrough, and a sealing member on said feed tube engaging said discharge tube for closing said second passage, said sealing member being axially movable with said feed tube for opening said second passage.

7. In a cream separator including a supply can and a discharge tube for discharging liquid from said supply can; a metering valve assembly comprising a milk-feed tube disposed within said discharge tube and providing therewith first and second concentric passages, a support connected to said feed tube, said support extending upwardly within said supply can, a rack arm positioned adjacent said support for relative vertical movement, a metering member connected to said rack arm for movement therewith, said metering member including an annular tapering metering surface adapted to move axially within said first passage, a float arm pivotally connected to said support, a pinion movable by said float arm, and a float on said float arm, said pinion engaging said rack arm for moving the same during a lowering of the liquid level within said can whereby said metering surface is moved relative to said first passage and the flow of liquid is controlled therethrough.

8. In a cream separator including a supply can and a discharge tube for discharging liquid from said supply can; a metering valve assembly comprising a milk-feed tube disposed within said discharge tube and providing therewith first and second concentric passages, a support connected to said feed tube, said support extending upwardly within said supply can, a rack arm positioned adjacent said support for relative vertical movement, a metering member connected to said rack arm for movement therewith, said metering member including a metering surface adapted to move relative to said first passage, a float arm pivotally connected to said support, a pinion movable by said float arm, and a float on said float arm, said pinion engaging said rack arm for moving the same during a lowering of the liquid level within said can whereby said metering surface is moved relative to said first passage and the flow of liquid is controlled therethrough.

9. In a cream separator including a supply can, a metering valve assembly comprising a milk-feed tube connected to said supply can, a support connected to said feed tube, said support extending upwardly within said supply can, a rack arm positioned adjacent said support for relative vertical movement, a metering member connected to said rack arm for movement therewith, said metering member including a metering surface adapted to move relative to said feed tube, a float pivotally connected to said support, a pinion connected to and movable by said float, said pinion engaging said rack arm for moving the same during a lowering of the liquid level within said can whereby said metering surface is moved relative to said first passage and the flow of liquid is controlled therethrough.

10. In a cream separator including a supply can; a metering valve assembly comprising a milk-feed tube connected to said can, a support on said tube, a metering member movable relative to said tube, said member having a metering surface, a rack connected to said metering member, and a float including pinion means engaging said rack for moving the same vertically during a rise and fall of the liquid level of said can whereby said metering surface is moved relative to said tube to control the discharge of liquid therethrough.

References Cited in the file of this patent
UNITED STATES PATENTS

| 793,629 | Anker-Holth | July 4, 1905 |
| 1,176,478 | Mohr | Mar. 21, 1916 |
| 2,504,261 | Harstick | Apr. 18, 1950 |
| 2,630,966 | Harstick | Mar. 10, 1953 |